Sept. 12, 1950     G. G. MOZZANINI ET AL     2,521,801
CONTROL MEANS FOR VARIOUS MACHINES THROUGH A LEONARD
GROUP OR THE LIKE, INCLUDING A MOTOR
WITH A FIELD-CONTROLLED SPEED Filed April 11, 1945     3 Sheets-Sheet 1

INVENTORS
Georges Gabriel Mozzanini
and
Maurice Lebertre
BY George N Corey
ATTORNEY

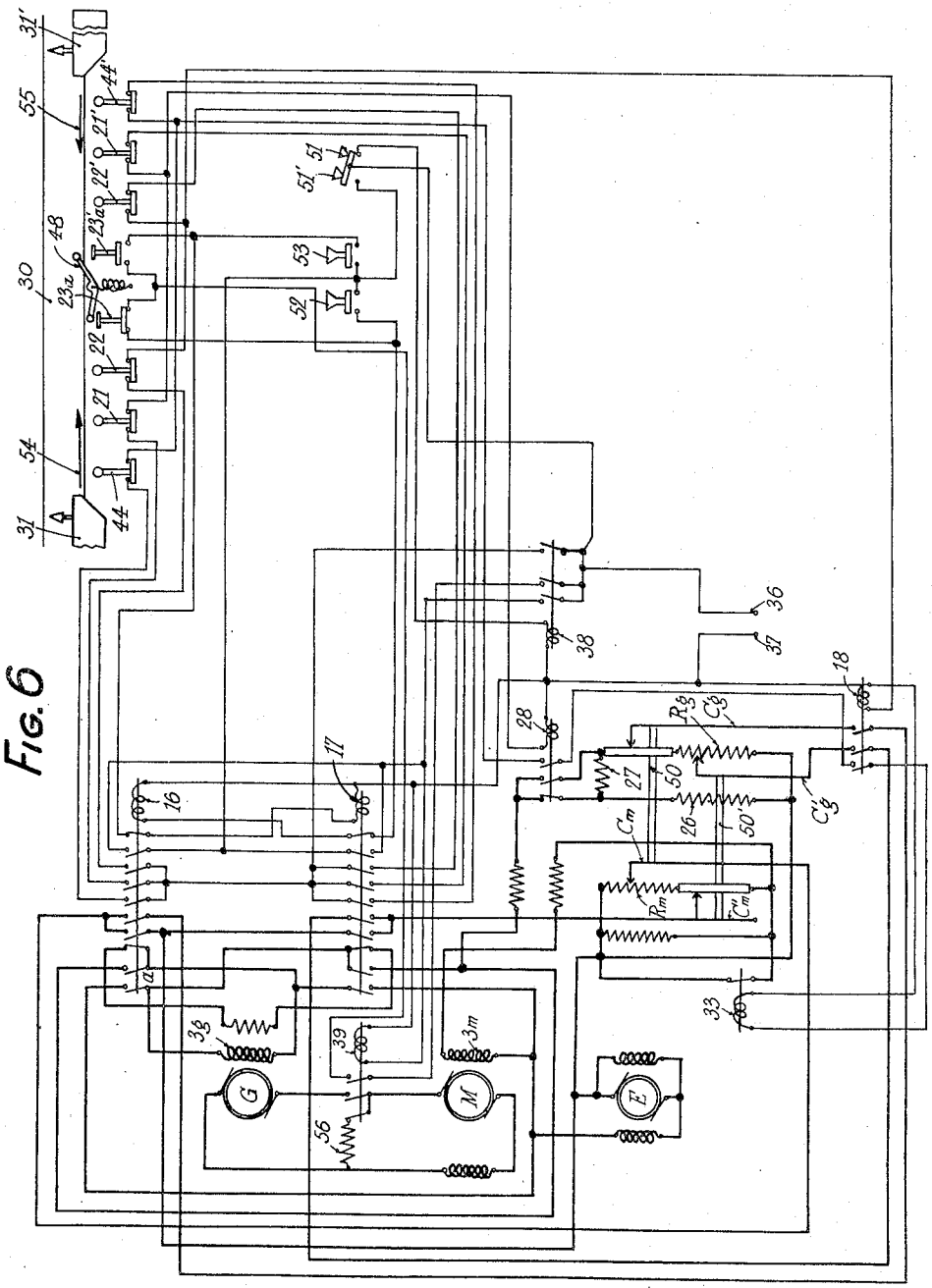

Patented Sept. 12, 1950

2,521,801

UNITED STATES PATENT OFFICE 2,521,801

CONTROL MEANS FOR VARIOUS MACHINES THROUGH A LEONARD GROUP OR THE LIKE, INCLUDING A MOTOR WITH A FIELD-CONTROLLED SPEED

Georges Gabriel Mozzanini, La Garenne Colombes, and Maurice Lebertre, Neuilly-sur-Seine, France Application April 11, 1945, Serial No. 587,714
In France April 27, 1943

Section 1, Public Law 690, August 8, 1946
Patent expires April 27, 1963

16 Claims. (Cl. 318—154)

This invention relates in general to a means for controlling a direct current motor and more particularly to an improved method and means for smoothly decelerating the motor to a predetermined stopping point regardless of the running speed prior to the beginning of deceleration.

The method disclosed applies to a variable voltage direct current motor, i. e., a motor whose speed is reduced or increased by the reduction or increase respectively of the voltage applied to the motor armature.

The commonest variable voltage motor system is one in which the motor receives its armature current from a generator driven at a constant speed. The field excitation of the generator may then be varied in order to effect changes in the motor armature voltage and hence of the motor speed. As hereinafter described, our method will be explained in connection with a Leonard system, but it is to be understood that it is equally applicable to any other system in which the speed of the motor is altered by changing the field or the armature voltage. Likewise, the preferred forms of the apparatus will be described with reference to a Leonard system, but it will be readily apparent that they could be employed in connection with other means for varying the motor field or armature voltage.

Many systems have been provided in the past for reducing the speed of a motor in a Leonard system from one absolute speed to another by making a one step reduction in the field excitation of the generator. In our copending United States patent application, Serial Number 587,712, filed April 11, 1945, now Patent No. 2,462,120, February 22, 1949, entitled "Speed controlling means for D. C. motors," and in our copending application Serial No. 766,670, filed August 6, 1947, which is a continuation in part of the application Serial No. 587,712, we disclose a system for producing a sequence of motor speeds for a special application. It is a feature of such systems that there are between the various operating speeds, periods of acceleration or deceleration, and the efficiency of the machine involved is greatly increased if these periods can be reduced in duration. These applications as well as our copending application Serial Number 587,713, filed April 11, 1945, now Patent 2,474,516, and entitled "Direct current motors for obtaining a rapid rise in speed thereof," disclose a method and apparatus for reducing the period of acceleration from standstill or from a previous operating speed to a new operating speed which has been predetermined by the adjustment of a variable resistance somewhere in the system. The present invention is concerned with periods of deceleration from a prior operating speed to a new operating speed or to a standstill. It is particularly concerned with a Leonard system in which these operating speeds are determined by the setting of a generator field resistance, and it accomplishes its objects in a particular apparatus without requiring any adjustments of the deceleration means for deceleration from various operating speeds.

One major object of the invention is to provide a deceleration control which will decelerate the moving part of the driven machine precisely to a selected position regardless of the previous operating speed. The advantages of this type of operation are particularly apparent in the case of a machine tool such as a planer in which it is desirable to reciprocate the planer table at different speeds for different types of work while at the same time causing the planer table to stop and reverse at a precise point of its travel.

A second object of the invention is to provide adjustable means for determining the precise stopping position or the precise position at which the new lower speed will be attained. Other objects involve the provision of a simple and reliable means for reducing the period of deceleration and precisely controlling it.

In order to accomplish these and other objects which will be apparent from the description of the various embodiments we provide means for reducing the speed of the motor from its initial operating speed to a certain low speed which is preferably very near the minimum operating speed of the motor. The motor armature voltage is then reduced to zero, if the motor is to be stopped, by interrupting the generator field excitation or otherwise, and the motor comes to a stop in the conventional manner. Instead of stopping the motor, however, it may be operated at a new lower operating speed. The novel feature of our invention is the means provided for reducing the motor speed to this fixed low speed by the same apparatus whatever may have been the initial operating speed. We refer to this preparatory speed reduction as "voltage preparation" since it is accomplished by preparing the voltage of the motor armature (to an extent which increases automatically in proportion to the magnitude of the initial operating speed). In the simplest form of the invention this involves increasing the speed-determining resistance, usually the variable field excitation resistance in the generator field circuit of a Leonard system, by increasing this generator field resistance to its maximum value. In the usual field excitation resistance a variation is accomplished by short-circuiting a part of the resistance through a slider; when such a resistance is employed voltage preparation may be achieved by disconnecting the slider, thus placing the entire field resistance in the generator field circuit. We prefer, however, to precede this simplest form of voltage preparation with a first voltage preparation step designed to accomplish the deceleration with greater smoothness and without the sudden stresses to which the motor may be subjected if it is attempted to decelerate it from a relatively high speed with a voltage preparation of only one step.

In the preferred embodiment of our invention used with a Leonard system, we provide a set of resistances in the field excitation circuit arranged in two parallel branches, the resistance in the first parallel branch being a variable resistance used for predetermining the generator voltage (and hence the motor speed) and the second parallel branch containing a first constant resistance which is preferably of the same degree of magnitude as the maximum value of said variable resistance. A second fixed resistance is employed and switch means is provided for placing of this second fixed resistance either in said first parallel branch or in said second parallel branch. Under ordinary operating speed conditions, the second fixed resistance is placed in the second parallel branch in series with the first fixed resistance. The first voltage preparation is accomplished by shifting this second fixed resistance into the first parallel branch to place it in series with the variable speed-determining resistance; the second voltage preparation step is then the disconnecting of the variable resistance slider and the final decelerating operation is to open the generator field. It will be seen that when the motor is operating at a relatively high speed (i. e. the variable resistance of the generator field circuit has been reduced to a very small value) then the shifting of the second fixed resistance into the first parallel branch very substantially reduces the generator field and has a powerful decelerating effect. On the other hand, when the motor is operating at a very low speed (i. e. the variable resistance in the generator field circuit is near its maximum value) then the shifting of the second fixed resistance into the first parallel branch will have very little effect and a very little voltage preparation will result when only slight deceleration is required.

Still another preparation step may be accomplished by increasing the field excitation of the motor to a maximum value, in one or more steps in the manner similar to that disclosed in our prior application Serial Number 587,712.

Our invention covers also, in a control for Lenard groups of the type disclosed, improvements corresponding to those disclosed in our copending U. S. patent application, Serial Number 587,712, filed April 11, 1945, and entitled "Speed controlling means of D. C. motors," said improvements being in particular the following:

(a) High speed of braking.
(b) Constancy of the distance moved over by the controlled part during a deceleration, whatever the speed may be.
(c) Accuracy in stopping.
(d) Addition to said controlled part of an indicator of the path travelled over by same, said indicator allowing a predetermined adjustment of said path, as to magnitude and position, with reference to a stationary point, for instance with reference to a tool if the controlled machine is a machine-tool, whatever the conditions of operation may be.

These improvements are executed, in the case of a Leonard group, through the method applied for stopping same, which method forms one of the chief features of our present invention. According to said method, the speed of the motor, whatever its value may be, is brought to a predetermined value near that of the smallest speed which may be developed with the group considered at the moment when the generator excitation is cut off and the armature braking is started (or at the moment when said excitation is reversed in the case of a Leonard group adapted for reverse operation).

Our invention provides also means for varying the excitation current of the generator, and consequently the voltage supplied to the armature of the motor, in one or two steps, according to the magnitude of the variation to be made in voltage applied in order to bring the voltage down to the minimum value corresponding to the minimum operating speed of the motor.

We may state as further advantages for a Leonard group according to our invention, the following:

(a) The possibility of obtaining, for the controlled part, short paths of travel without any abnormal stress being laid on the mechanical and electrical apparatus.

(b) An automatic limitation in the adjustment of the maximum speed used when low speeds are applied. To this end the electrical portion of the group and its control means are provided with arrangements similar to those disclosed in our firstmentioned copending application Serial No. 587,712.

In brief, we obtain thus a group of the Leonard type which has many advantages over the Leonard groups now in general use, as concerns the control of various machines. Our improved group, while retaining the flexibility of all Leonard groups, shows, by reason of these advantages, new possibilities such as, for instance, the possibility of allowing an automatic modification in speed during the actual stroke of the driven part at predetermined points of its path, said modification being performed very rapidly. A control group with such improvements forms per se a novel feature of the invention.

In the accompanying drawings, we have shown diagrammatically and solely by way of example, several embodiments of our invention.

In said drawings:

Fig. 6 is a wiring diagram of our invention as particularly applied to planers.

Figure 1:
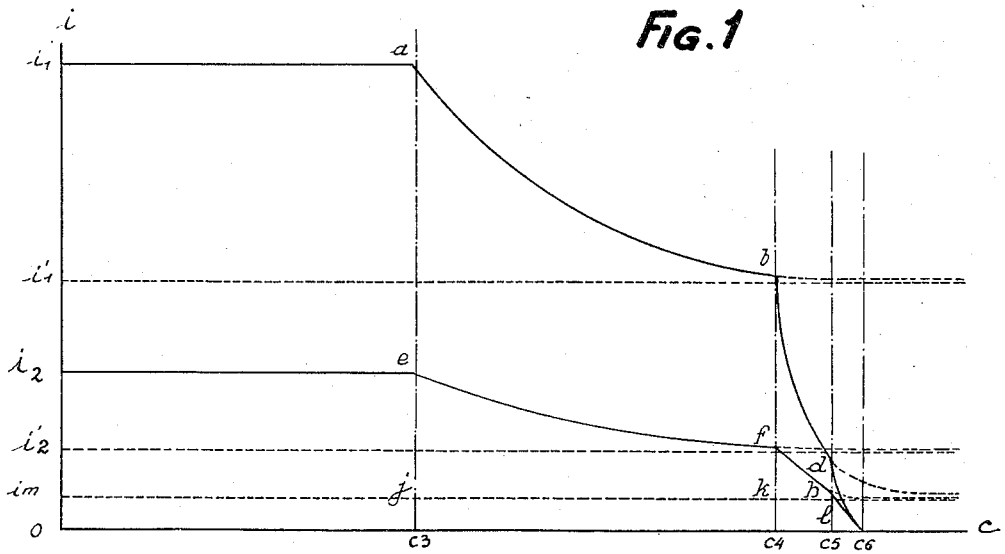
Fig. 1 is a graph showing for two different operating speeds of the motor the changes in field excitation of a Leonard group generator as a function of the distance moved by the driven part by the motor during a period of deceleration.
Figure 2:
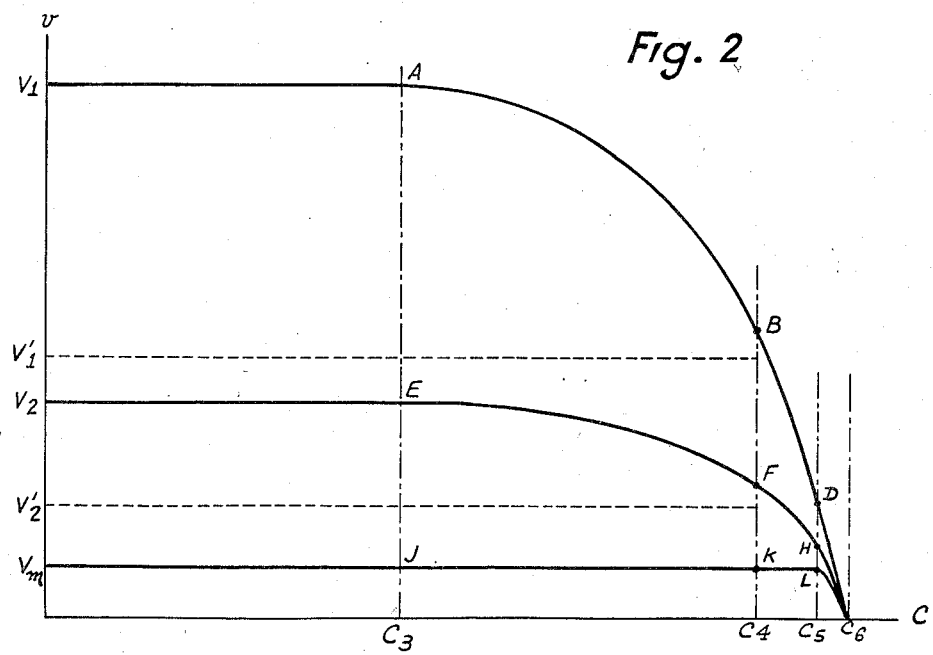
Fig. 2 is a graph showing the speed of the motor as a function of the distance moved by the driven part for three different operating speeds.

With a view to a clearer disclosure of the method used for stopping the motor in conformity with our invention, we have drawn in Figs. 1 and 2 diagrams showing respectively the field excitation $i$ of the generator and the speed $V$ as functions of the path travelled over by the driven part. The first voltage preparation for stopping is performed at C3 and the second at C4. The current is switched off at C5 and the stopping takes place at C6. In each of said diagrams, three examples of working speeds have been shown: a speed V1 of 1050 R. P. M. corresponding to an excitation $i1$ of the generator, a speed V2 of 420 R. P. M. corresponding to an excitation $i2$ and a speed V$m$ of 100 R. P. M. corresponding to an excitation $im$ which we will suppose to be the minimum speed obtainable with the Leonard group considered.

Considering that the motor is running at the speed V1, it is apparent that the first voltage preparation consists in bringing the speed down to an intermediary speed V'1, Fig. 2, corresponding to an excitation $i'1$, Fig. 1. If the motor were running at a smaller speed V2 corresponding to an excitation $i2$, it is apparent that the intermediary speed is V'2 corresponding to an excitation $i'2$ lower than $i'1$.

But before the speed V'1 (or V'2) is reached, the second voltage preparation is performed at C4 in order to reduce the intermediary speed V'1 corresponding to $i'1$ to the minimum speed V$m$ corresponding to the minimum excitation $im$.

Starting from the speed V2 corresponding to a normal working excitation $i2$, the first voltage preparation reduces the intermediary speed to V'2 corresponding to $i'2$ and at C4, as above mentioned, the second preparation causes this speed V'2 to approach asymptotically the minimum speed V$m$.

It is thus apparent that, in both cases, when the excitation of the generator is cut off, i. e. at point C5, the speed has been brought down to substantially the same value approximating the minimum speed V$m$ obtainable with the Leonard group considered. Consequently the motor will always stop at the same point C6 whatever the original speed of operation may have been.

As mentioned hereinabove, it is also possible, in accordance with our invention, to perform the voltage preparation in one stage instead of two. For example, if the actual running speed is V'1 with excitation $i'1$ preparatory change of the excitation at C4 to that approximating $im$ would make it possible to cut off excitation at C5 to stop the motor at C6. It is however preferable to proceed in two stages in order to avoid, in the case where moderately high speeds are used, a more or less harsh slowing down which would be detrimental during the preparation period. The two-stage preparation allows a more progressive slowing down.

The method described shows another advantage which we will now disclose. It is a well-known fact that one is often led to limit the rate at which the voltage is lowered for the purpose of braking having regard to the considerable inertia appearing at high speeds. Consequently the braking at moderately high and at high speeds is less rapid with the usual method than it might be otherwise. With the method in accordance with our invention, the division into three stages of the variation in voltage (two preparation stages at C3 and C4 and a stage for cutting off at C5) produces at high running speeds a braking which is less abrupt than that which would be obtained with the usual method, whereas at moderately high and at low running speeds the braking is comparable with that which is usually possible with ordinary controls. This allows the braking to be accomplished at these higher speeds with all the rapidity which may be desired.

It should be noted that, during the period of slowing down which results from the preparation of voltage before braking, the variation in voltage does not prevent retaining a useful driving torque which allows the performing of this preparation in the useful stroke of the part driven by the motor.

The method for preparing the voltage as described above with a view to braking the motor in a Leonard group is, to a certain extent, related to the method of preparing the field, described with reference to motors the speed of which is field-controlled in our first mentioned copending application Serial No. 587,712, with the essential difference, however, that the variations in the exciting current are in the opposite direction. This leads, moreover, to the use, for executing said method, of an electrical device which is altogether different from that described in said copending application for motors the speed of which is field-controlled.

In fact in this latter case, the preparation of the field, obtained by a part short-circuiting of an excitation rheostat for the motor, is less advantageous for speeds the value of which is lower than that which corresponds to the preparatory field while in the case of preparing the voltage by applying an excitation which corresponds to the preparation voltage, this would produce, it is true, the desired preparation for speeds the value of which is higher than that which corresponds to the preparation voltage, but in the case of speeds lower than the latter, such an excitation would necessarily lead during preparation, to the use of the preparation characteristic which would mean in this case an increase in normal running speed and would consequently be inadmissible.

Figure 3:
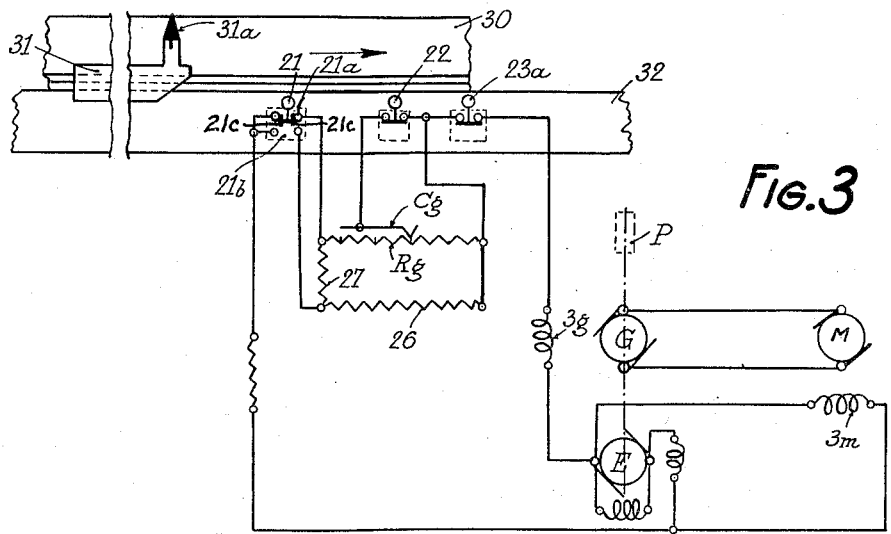
Fig. 3 is a wiring diagram of a simple form of our invention.

The simple embodiment of our deceleration system shown in Fig. 3 employs a Leonard group comprised of a motor M, a generator G supplying armature current to said motor M, an exciter E, exciting the fields $3m$ and $3g$ of said motor and said generator, respectively, and a power source P for driving said generator and exciter. Motor M is employed to drive a movable part 30, a planer table for instance, relative to a stationary frame 32, such as a planer bed. Mounted on stationary frame 32 are three switches 21, 22 and 23$a$ adapted to be depressed by a dog 31 carried on movable part 30 and preferably adjustable thereon in the direction of the movement.

The three switches 21, 22 and 23$a$ are used to progressively reduce the field excitation current in field $3g$ of generator G, thus reducing the speed of motor M, in this case, to standstill. In the field circuit of generator $3g$ there is a first parallel branch comprising a variable resistance R$g$ adjustable in magnitude by means of a slider C$g$, and a second parallel branch comprising a resistance 26 substantially equal to the maximum value of resistance R$g$. A resistance 27 is placed either in the second parallel branch (i. e. in series with resistance 26) if switch 21 is in its upper or unactuated position so as to divert the field current through upper contacts 21$a$; or in the first parallel branch (i. e. in series with resistance Rg) if switch 21 is depressed so as to divert the field current through lower contacts 21b. When switch 22 is depressed, slider Cg is disconnected and Resistance Rg is increased to its maximum value. The depression of switch 23a opens the circuit 3g causing the excitation current of the generator G to fall to zero and motor M to come to a stop. The switch 21 is provided with bridging contacts 21c for bridging between the respective upper stationary contacts 21a and the lower stationary contacts 21b as the switch 21 is moved from the upper to the lower position or the reverse in order to prevent interruption of the field excitation.

It will be seen that motor M may be driven at a high speed if Rg is reduced to a low value by adjusting Cg to the left, or at a low speed by increasing Rg to a high value by adjusting Cg to the right. The effect of shifting the resistance 27 from the connection in series with the first or variable parallel branch to connection in series with the second parallel branch thus produces a very large increase in the resistance of the generator field circuit and a very large reduction in generator field excitation when the motor and hence the movable part 30 are operating at high speed; at low speeds the effect of the transfer is relatively small, the extent of the difference being determined by a choice of magnitude for resistances 26, 27, and Rg. It is necessary, of course, that the total of resistances 26 and 27 shall equal or exceed the value of Rg if the shifting of resistance 27 is to increase rather than decrease the generator excitation and the motor speed. The decelerating effect of the operation of switch 21 is thus proportional to the initial operating speed. ("Proportional" is here used to mean any direct function.)

The depression of switch 22 introduces into the first parallel branch an additional resistance which is the part of Rg previously short circuited by slider Cg. It will be seen that this second decelerating effect is also proportional to the initial operating speed. Motor M and movable part 30 then approach asymptotically a low speed, preferably a minimum operating speed. Finally switch 23a is opened, reducing the field current of generator G to zero and causing M to come to a stop within a distance which is almost the same (within very close limits) regardless of the initial operating speed with which dog 31 approached switch 21.

If desired, the dog 31 may be provided with a pointer 31a so that graduations may be marked on movable part 30 indicating particular stopping points relative to stationary member 30 attained with corresponding settings of dog 31 on movable part 30.

Figure 4:
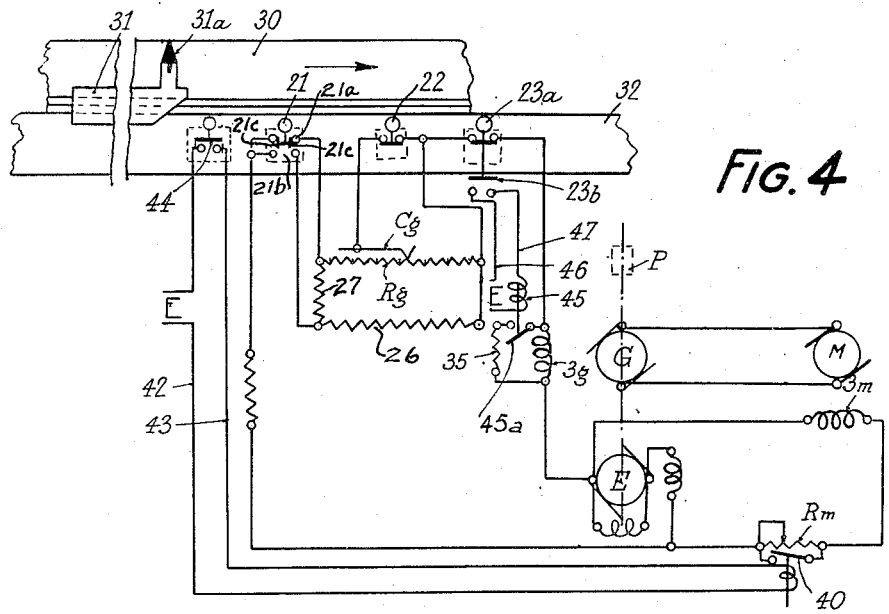
Fig. 4 is a diagram of an electrical-mechanical system embodying our invention.

In Fig. 4 the parts which correspond to those already described in connection with Fig. 3 are identified by the same identifying numerals and letters. An additional step has been introduced by increasing the excitation of motor field winding 3m to its maximum value before the voltage preparation steps. It is apparent, however, that this may involve more than one step. The increase in field excitation of motor M is accomplished by short circuiting resistance Rm through a relay operated contactor 40. A coil 41 which actuates the closure of short circuiting switch 40 is connected by means of conductors 42 and 43 to a source of operating current E (which is preferably exciter E) through a relay operating switch 44 mounted on the frame 32 of the controlled machine and actuated as in the case of 21, 22 and 23a by adjustable dog 31 as it travels with moving part 30. Thus, as moving part 30 approaches the desired stopping point, it first closes operating switch 44 and short circuiting switch 40 is closed by the action of coil 41. The field excitation of motor field 3m is immediately increased to a maximum value and a powerful deceleration effect occurs.

A second feature has been introduced to facilitate the interruption of the current of generator field winding 3g. Since winding 3g is highly inductive, any attempt to quickly interrupt it results in a high induced voltage which would cause severe and dangerous arcing at the interrupting switch if the coil were not simultaneously short circuited through an auxiliary resistance for dissipating the energy released by the interruption of the field current. Switch 23a is, therefore, provided with a mechanically coupled switch 23b which closes as switch 23a is opened and actuates a relay 45 preferably excited from excitor E, through conductors 46 and 47. Relay 45 closes switch 45a thereby short circuiting generator field 3g through dissipating resistance 35.

Figure 5:
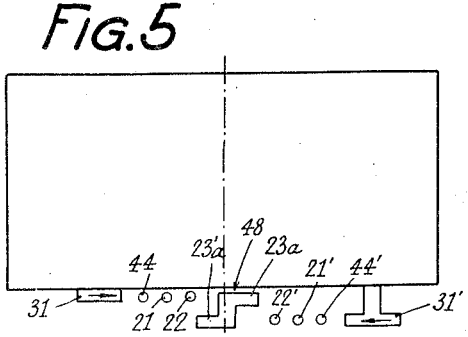
Fig. 5 is a schematic plan view of a conventional planer table and reversing switches.

It is apparent that the embodiments of Figs. 3 and 4 may be employed in bringing a planer table to a precise stopping point with relation to a planer bed. Reversing may be accomplished in any of the well-known ways, for instance by a reversal switch actuated simultaneously with 23a and 23b for reversing the excitation in generator field 3g; also deceleration of travel of part 30 as it moves in the opposite direction may be accomplished by the deceleration systems disclosed. In Fig. 5 for instance, dog 31, switches 44, 21, 22 and 23a are seen in plan. Switch 23a may, if desired, be actuated by reversing means 48 as described hereinafter in connection with Fig. 6. A second adjustable dog 31' is attached to movable member 30 and offset from the path of dog 31 so as to trip a set of switches 44', 21', 22' and 23'a for deceleration and stopping of travel in the opposite direction. Switches 23a and 23'a may be actuated by reversing lever 48 with offset parts as well-known in the prior art. It is necessary, of course, that reversing lever 48 must have no dead center position but must assume either a cutting or return stroke position after each actuation. Many such switches are known in the art and any suitable one may be used.

An electrical circuit suitable for stopping and reversing the planer table at the end of the cutting stroke and stopping and reversing the table at the end of the return stroke is shown in greater detail in Fig. 6 in which the various switchgear are operated by means of relay circuits which are shown in lines substantially lighter than those of the power circuits and are energized at terminals 36 and 37. Elements corresponding to those described in Figs. 3 and 4 are identified by the same letters or numerals.

The apparatus may be operated either manually or automatically depending on the selection made by switch buttons 51, and 51'. If 51' is depressed the machine is connected for manual operation. Depression of switch 52 by hand then actuates cutting stroke relay 16 and causes the machine to move in the direction of arrow 54 (i. e. the cutting stroke direction). As the dog 31 approaches reversing switch 48 it actuates switches 44, 21 and 22 but without effect, since the relay circuits of switches 44, 21 and 22 are not energized except during automatic operation. As dog 31 trips reversing lever 48, cutting stroke relay 16 is de-energized and the cutting stroke ends. As previously described, reversing lever 48 is incapable of assuming a dead center position and immediately tips to the right and depresses switch 23'a which prepares a control circuit for a reverse switch. When manual reversing button 53 is now depressed, return switch relay 17 is energized and planer table 30 moves to the left in the direction of the arrow 55 until stopped by the action of dog 31' on reversing lever 48.

If automatic operation is desired, however, button 51 is depressed (as shown in Fig. 6) thus energizing automatic operation relay 38, which simultaneously introduces switches 44, 21; 22, 44', 21' and 22' into the control circuit, and disconnects manual control buttons 52 and 53 from the control circuit.

Switches 44 and 44' perform the first decelerating operation as in Fig. 4 except that they now short circuit motor field resistance Rm by de-energizing relay 33. In the present embodiment, switches 21 and 21' shift resistance 27 by de-energizing relay 28. Finally, the slider Cg of resistance Rg for the generator field 3g is disconnected when switch 22 or 22' is depressed so as to de-energize relay 18. In Fig. 6 operating speed is predetermined not only by motor field resistance Rm but also by simultaneously setting generator field resistance Rg, by means of slider Cg, the sliders on the two resistances being operated by the single operating member 50. Since resistances Rm and Rg must also be adjusted to a return stroke value they are provided with auxiliary sliders C'm and C'g operated by the single operating member 50'.

As an additional feature, we have introduced relay 39 which is energized when the machine is operated either manually or automatically so as to connect the generator to the motor and to connect the other relay energizing circuits and the switches actuated by dogs 31, 31' to the power supplies 36 and 37. Also, resistance 56 is provided as a current dissipating resistance for motor M when operation is discontinued, the circuit between the generator G and motor M simultaneously being broken upon closing of circuit from the motor armature through resistance 56.

The novel resistance shifting system herein disclosed is useful for decelerating direct current motors whatever be their driving arrangement. Embodiments illustrated show the system applied to the field of a generator of a Leonard group, but it is clear that the same system may be used to decelerate the motor by increasing the field excitation of the motor, for instance, as described in our co-pending application Serial No. 587,712, entitled "Speed controlling means for direct current motors," filed the same day as the present case (April 11, 1945). The deceleration system herein disclosed applies generally, to any energizing current which controls the armature voltage of a direct current motor or its field excitation.

It will be further evident that this system is useful not only for bringing a direct current motor, or a movable part driven by a direct current motor to a precise stop at a predetermined point, regardless of the operating speed (within a wide range) prior to deceleration, but that it is also suitable for decelerating the motor and its driven part to a predetermined lower speed precisely at a predetermined point. To that purpose, it will be sufficient to adjust accordingly the position of dogs similar to dog 31 acting on switches similar to switches 44, 21 and 22. In this manner the motor and its driven part may be decelerated precisely at any given point or points of their travel without being brought to a stop as they would be at the end of their stroke by switch 23a.

The motor controlled by the improved Leonard group which has been described hereinabove may moreover be provided in the case of a motor the speed of which is field-controlled, with all the improvements described for this type of motor in our above mentioned copending application Serial No. 587,712.

Lastly, we may obtain, with a Leonard group having large variations in speed and a great ease in operation, the whole series of advantages which it was possible to obtain with a control system comprising a simple motor the variations in speed of which are field-controlled, as disclosed in said copending application Serial No. 587,712, with the furthr advantage of a great simplicity of control, due to the fact that we use a single common part for controlling the excitation rheostats of both the motor and the generator. Moreover through the association of these two rheostats, it is possible to obtain any desired succession of working speeds.

The control through the abovedescribed Leonard group may be applied, as already stated, to the control of machine tools such as planing machines. It should, however, be understood that our invention is not only applicable to the control of such machines, but also to that of all other apparatuses or machines chiefly rolling mills, drawing engines, lifts, cranes, printing machines, paper machines, textile machines and the like.

Moreover, within the scope of the invention many modifications may be brought to the details of execution of the abovedescribed and illustrated arrangements, chiefly with a view to adapting them to the application considered.

What we claim is:

1. Apparatus for controlling the speed of a direct current motor which comprises a circuit carrying an energizing current of said motor, a variable impedance, means cooperating with said impedance and electrically connected to said circuit and adapted upon adjustment of said variable impedance to determine said energizing current so as to determine the operating speed of said motor, an impedance connected in parallel with said variable impedance, an auxiliary impedance, and means actuatable alternatively to connect said auxiliary impedance in series respectively with said variable impedance and with said parallel impedance while connecting said impedances thus connected in series in parallel with the remaining impedance.

2. Apparatus for controlling the speed of a direct current motor which comprises a circuit carrying an energizing current of said motor, a variable impedance, means cooperating with said impedance and electrically connected to said circuit and adapted upon adjustment of said variable impedance to determine said energizing current so as to determine the operating speed of said motor, an impedance connected in parallel with said variable impedance, an auxiliary impedance, means actuatable alternatively to connect said auxiliary impedance in series respectively with said variable impedance and with said parallel impedance while connecting said impedances thus connected in series in parallel with the remaining impedance, and means operated by said motor upon a predetermined movement of the armature thereof for actuating said alternatively actuatable means to change said auxiliary impedance from one of said series connections to the other to change the speed of the motor.

3. Apparatus for controlling the speed of a direct current motor which comprises a circuit carrying an energizing current of said motor, a variable impedance, means cooperating with said impedance and electrically connected to said circuit and adapted upon adjustment of said variable impedance to determine said energizing current so as to determine the operating speed of said motor, an impedance connected in parallel with said variable impedance, an auxiliary impedance, means actuatable alternatively to connect said auxiliary impedance in series respectively with said variable impedance and with said parallel impedance while connecting said impedances so connected in series in parallel with the remaining impedance, means for abruptly changing said variable impedance to determine a speed different from said predetermined operating sped, and means operated by said motor upon a predetermined movement of the armature thereof for actuating said alternatively actuatable means to change said auxiliary impedance from one of said series connections to the other and concomitantly to operate said means for abruptly changing said variable impedance to change the speed of the motor.

4. Apparatus for controlling the speed of a direct current motor as defined in claim 1 which comprises means operated by said motor concomitantly with a predetermined movement of the armature thereof for interrupting the armature current of said direct current motor to stop said motor.

5. Apparatus for controlling the speed of a direct current motor supplied from a direct current generator which comprises a field excitation circuit for said generator, a variable resistance in said generator field excitation circuit adapted to be adjusted to determine the excitation current to determine the voltage supplied to the motor, a resistance connected in parallel with said variable resistance, an auxiliary resistance, means actuatable alternatively to connect said auxiliary resistance in series respectively with said variable resistance and said parallel resistance while connecting said resistances thus connected in series in parallel with the remaining resistance, means operated by said motor upon a predetermined movement of the armature thereof for actuating said alternatively actuatable means to change said auxiliary resistance from one of said series connections to the other to change the speed of the motor.

6. Apparatus for decelerating a direct current motor supplied from a direct current generator which comprises a field excitation circuit for said motor, a variable resistance connected in said motor field circuit and adapted to be adjusted to determine the excitation current in said motor field, means for short circuiting said variable resistance in said motor field excitation circuit, a field excitation circuit for said generator, a variable resistance in said generator field circuit adapted to be adjusted to determine the excitation current in said generator field, a resistance connected in parallel with said variable resistance in said generator field circuit, an auxiliary resistance, electrical control means adapted alternatively to connect said auxiliary resistance in series respectively with said variable resistance in said generator field circuit and said parallel resistance while connecting said resistances thus connected in series in parallel with the remaining resistance of said generator field circuit, means operated by said motor upon a predetermined movement of the armature thereof and adapted to actuate said short circuiting means to short circuit said motor field variable resistance to decelerate said motor, and means operated by said motor upon a further predetermined movement of the armature thereof and adapted to actuate said electrical control means to change said auxiliary resistance from said connection in series with said parallel resistance to connection in series with said variable resistance further to decelerate said motor.

7. Apparatus for decelerating a direct current motor supplied from a direct current generator as defined in claim 6 which comprises means for interrupting said field excitation circuit of said generator to reduce the armature current of said direct current motor to an ineffective value, and means actuated by said motor upon a still further predetermined movement of the armature thereof for actuating said interrupting means for stopping said motor.

8. Apparatus for controlling the speed of a direct current motor driving a movable member of a machine which comprises a direct current generator supplying current to the armature of said motor, a generator field excitation circuit, a variable resistance in said generator field excitation circuit adapted to be adjusted to determine the excitation current to determine the voltage supplied to the motor to control the operating speed thereof, a resistance connected in parallel with said variable resistance, an auxiliary resistance, means actuatable alternatively to connect said auxiliary resistance in series respectively with said variable resistance and with said parallel resistance while connecting said resistances thus connected in series in parallel with the remaining resistance, means for abruptly increasing said variable resistance to a value determining a low speed of said motor, means for interrupting said generator field excitation circuit, and means operated by said movable machine member upon consecutive predetermined movements thereof for actuating said alternatively actuatable means to change said auxiliary resistance from series connection with said parallel resistance to series connection with said variable resistance so as to effect reduction of the speed of said motor and then to operate said means for abruptly increasing said variable resistance to effect reduction of said speed to said low speed value and thereafter to operate said means for interrupting said field excitation circuit of said generator to stop said motor.

9. Apparatus for controlling the speed of a direct current motor, as defined in claim 8 which comprises a field excitation circuit of said motor, and means operated by said movable member upon a predetermined movement thereof prior to actuation of said alternatively actuatable means and connected to said field circuit of said motor for abruptly increasing the field excitation current of said motor for effecting deceleration thereof.

10. Apparatus for controlling the speed of a direct current motor, as defined in claim 8 which comprises a dissipating resistance connected to said generator field circuit, and means cooperating with said means for interrupting said generator field excitation circuit for short circuiting the field of said generator through said dissipating resistance upon said interruption of said generator field circuit.

11. Apparatus for controlling the speed of a direct current motor driving a reciprocatable member of a machine which comprises a direct current generator supplying current to the armature of said motor, a generator field excitation circuit, a variable resistance in said generator field excitation circuit adapted to be adjusted to determine the excitation current to predetermine the voltage supplied to the motor, a resistance connected in parallel with said variable resistance, an auxiliary resistance, means actuatable alternatively to connect said auxiliary resistance in series respectively with said variable resistance and with said parallel resistance while connecting said resistances thus connected in series in parallel with the remaining resistance, a reversing switch for reversing the current in said generator field excitation circuit to effect reversal of said motor and said reciprocatable member driven thereby, and means operated by said reciprocatable machine member upon a predetermined movement thereof in the respective directions of its reciprocation for actuating said alternatively actuatable means to change said auxiliary resistance from series connection with said parallel resistance to series connection with said variable resistance so as to effect reduction of the speed of said motor and thereafter to operate said reversing switch to reverse the current in said generator field excitation circuit to reverse the direction of movement of said motor and said machine member driven thereby.

12. Apparatus for controlling the speed of a direct current motor driving a reciprocatable member of a machine as defined in claim 11 which comprises a pair of control elements respectively positioned at predetermined points along the path of movement of said reciprocatable machine member in the respective directions of movement thereof, said control elements each being operatively connected to said alternatively actuatable means and being operable to change said auxiliary resistance from said series connection with said parallel resistance to series connection with said variable resistance so as to effect reduction of the speed of said motor, and means carried by said reciprocatable member and adapted in the respective directions of movement of said member first to operate the respective control element to actuate said alternatively actuatable means to effect reduction of the speed of the motor and thereafter to operate said reversing switch to reverse the direction of excitation of said generator field so as to reverse the direction of movement of said motor and said reciprocatable member driven thereby.

13. The combination as defined in claim 12 which comprises a motor field excitation circuit, a resistance connected in said motor field excitation circuit in series with the field winding of said motor, means for short circuiting said motor field circuit resistance, and means operated by said reciprocatable member in each direction of movement thereof for operating said short circuiting means before actuation of said alternatively actuatable means to cooperate therewith in effecting reduction of the speed of the motor.

14. The combination as defined in claim 11 which comprises a motor field excitation circuit, a variable resistance connected in said motor field excitation circuit in series with the field winding of said motor, means operatively connected to said variable resistances for simultaneously adjusting the amount of said resistances respectively in said generator field circuit and in said motor field circuit to predetermine the operating speed of the motor during a forward stroke, means operatively connected to said variable resistances for simultaneously adjusting the amount of said resistances respectively in said generator field circuit and in said motor field circuit during the reverse stroke, and means operatively connecting said reversing switch to said forward direction and reverse direction adjusting means to determine the speeds of said motor and said machine part driven thereby in the forward and reverse directions.

15. A rheostat for controlling the current flowing in an electric circuit which comprises a variable impedance, an impedance connected in parallel with said variable impedance, an auxiliary impedance, and means actuatable alternatively to connect said auxilary impedance in series respectively with said variable impedance and with said parallel impedance while connecting said impedances thus connected in series in parallel with the remaining impedance.

16. Apparatus for controlling the speed of a direct current motor which comprises means cooperating with said motor in the operation thereof adapted to carry a current which determines the speed of the motor, a variable impedance, an impedance connected in parallel with said variable impedance, an auxiliary impedance, and means actuatable alternatively to two operating positions and effective in one position to connect said auxiliary impedance in series with said variable impedance and to connect said thus connected auxiliary and variable impedances in parallel with said parallel impedance, said means being effective in the other position to connect said auxiliary impedance in series with said parallel impedance and to connect said thus connected auxiliary and parallel impedances in parallel with said variable impedance, said impedances thus connected being connected to said means cooperating with said motor for varying the current carried by said cooperating means upon variation of said variable impedance and for abruptly changing said current upon actuation of said alternatively actuatable means.

GEORGES GABRIEL MOZZANINI.
MAURICE LEBERTRE.

REFERENCES CITED

The following references are of record in the file of this patent:

UNITED STATES PATENTS

| Number | Name | Date |
|---|---|---|
| 865,813 | Powell | Sept. 10, 1907 |
| 924,786 | James | June 15, 1909 |
| 1,089,658 | Mason | Mar. 10, 1914 |
| 1,121,544 | Wilkinson | Dec. 15, 1914 |
| 1,150,035 | James | Aug. 17, 1915 |
| 1,305,031 | Tirrill | May 27, 1919 |
| 1,350,937 | Perry | Aug. 24, 1920 |
| 1,389,342 | Blood | Aug. 30, 1921 |
| 1,392,255 | Lammers | Sept. 27, 1921 |
| 1,411,586 | Rogers | Apr. 4, 1922 |
| 1,943,498 | Von Ohlsen | Jan. 16, 1934 |
| 1,966,077 | Nyman | July 10, 1934 |
| 2,453,462 | Sellers | Nov. 9, 1948 |

FOREIGN PATENTS

| Number | Country | Date |
|---|---|---|
| 660,836 | Germany | June 3, 1938 |